No. 788,142. PATENTED APR. 25, 1905.
R. S. PEASE.
METHOD OR ART OF MANUFACTURING BODIES OF GLASS.
APPLICATION FILED JULY 16, 1902.
2 SHEETS—SHEET 1.
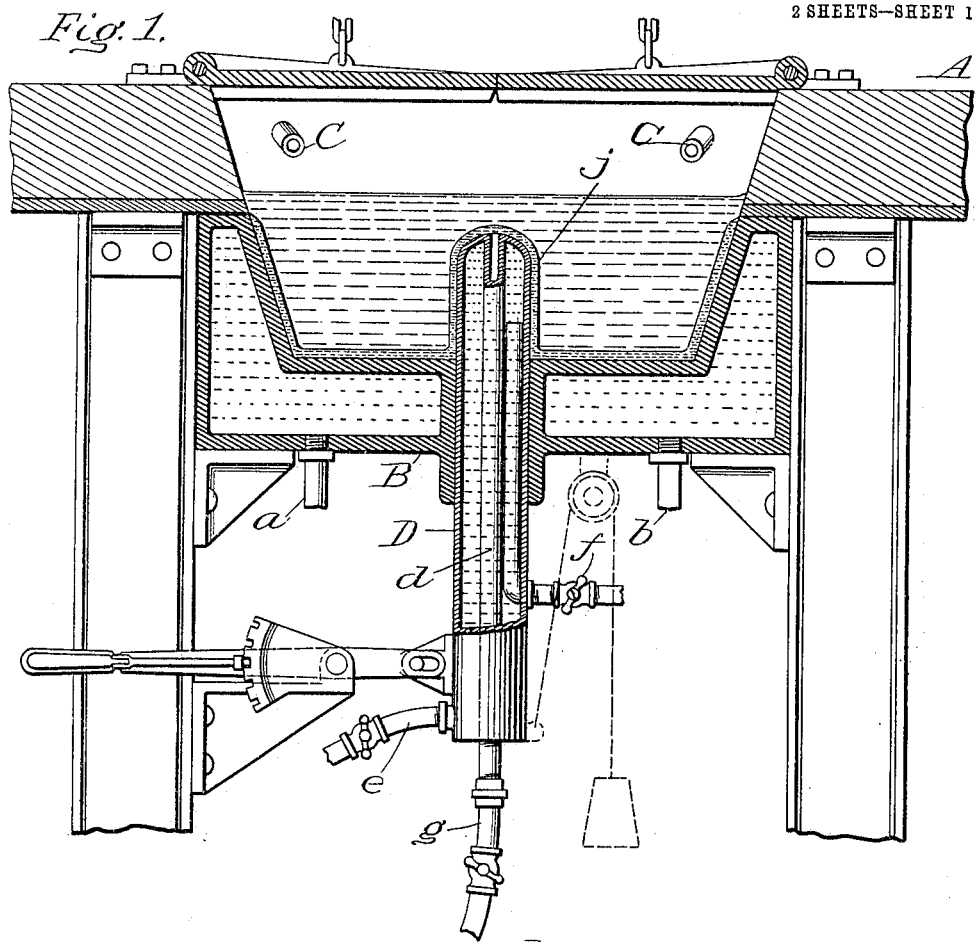
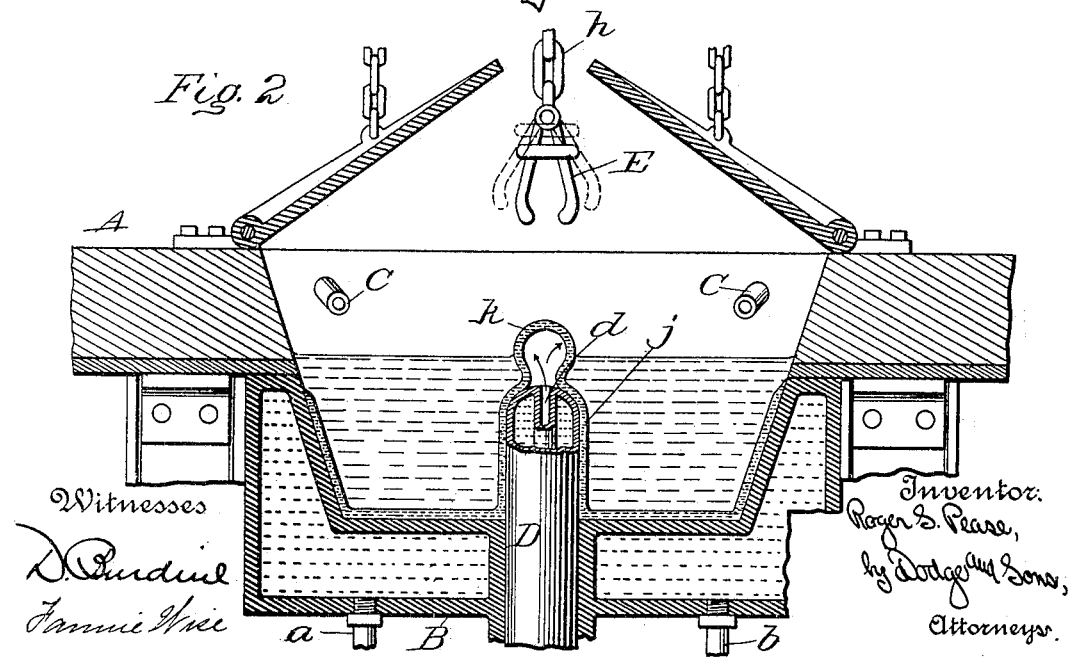

No. 788,142. PATENTED APR. 25, 1905.
R. S. PEASE.
METHOD OR ART OF MANUFACTURING BODIES OF GLASS.
APPLICATION FILED JULY 16, 1902.
2 SHEETS—SHEET 2.
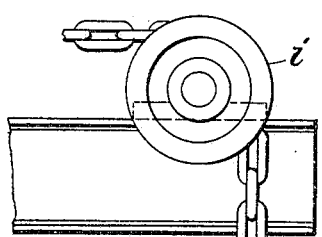
Fig. 4.
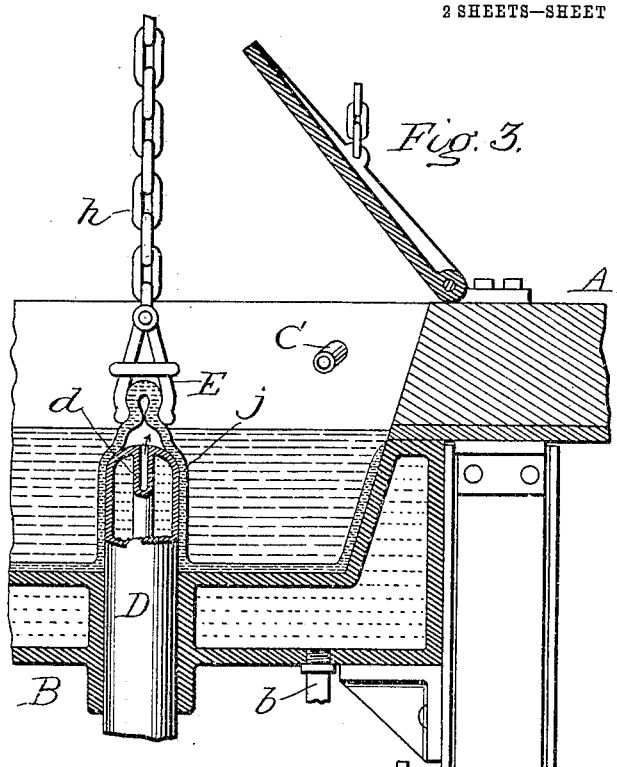
Fig. 3.
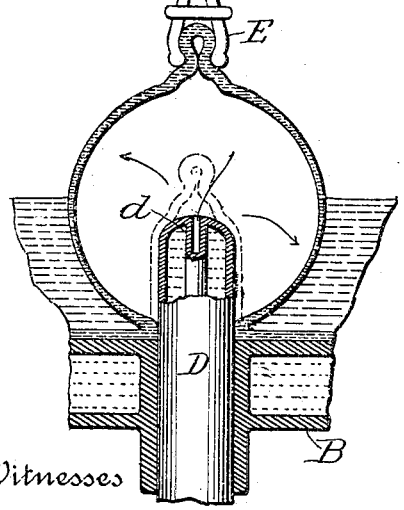
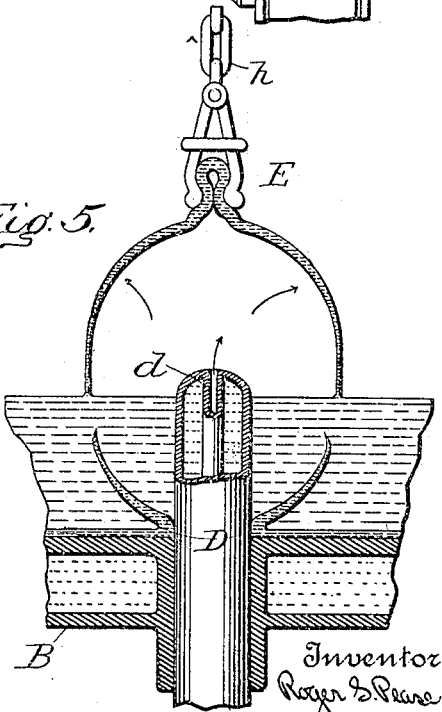
Fig. 5.
Witnesses
D. Burdine
Fannie Wise
Inventor:
Roger S. Pease,
by Dodge & Sons,
Attorneys.

No. 788,142.

Patented April 25, 1905.

UNITED STATES PATENT OFFICE.

ROGER SHERMAN PEASE, OF ROSE, MINNESOTA.

METHOD OR ART OF MANUFACTURING BODIES OF GLASS.

SPECIFICATION forming part of Letters Patent No. 788,142, dated April 25, 1905.

Application filed July 16, 1902. Serial No. 115,859.

*To all whom it may concern:*

Be it known that I, ROGER SHERMAN PEASE, a citizen of the United States, residing at Rose, in the county of Ramsey and State of Minnesota, have invented certain new and useful Improvements in the Method or Art of Manufacturing Bodies of Glass, of which the following is a specification.

My invention consists in a novel method, mode, or art of producing glass cylinders, tubes, and other bodies, either for use as such or for subsequent conversion into sheets or plates.

Stated briefly, the method, mode, or art consists in chilling a film or layer of molten glass within or constituting a part of the mass from which the tube or cylinder is to be drawn, introducing air or gas under pressure within or beneath the film or chilled portion of the glass, thereby expanding the same into a hollow sphere or spheroid extending above the level of the molten glass, continuing the internal pressure until the desired diameter is attained, and thereafter elevating in any convenient way the hollow body thus produced, which, serving as a bait and being united at its lower edge or skirt with the molten metal, causes a cylinder of glass to be drawn from the mass, the thickness of the walls of which will be determined by the fluidity of the glass or metal and the rate of elevation of the bait formed by the initial blowing or expansion.

Various forms of apparatus may be employed to carry out the method or art of manufacture thus outlined and hereinafter more fully described, or it may be performed manually and without special machinery or appliances, the present invention consisting, broadly, in the series of steps indicated and in certain combinations of steps or submethods, which will be duly indicated at the close of the description.

For convenience of explanation I shall describe the invention in connection with one form or embodiment of apparatus suitable to the carrying out thereof, the claim to the apparatus being embodied in my copending application, Serial No. 115,860, filed July 16, 1902.

The annexed drawings illustrate one of various forms of apparatus which I have devised.

In the drawings, Figure 1 is a sectional view of so much of the apparatus as is necessary to a clear understanding of the art or mode of manufacture herein set forth, it being understood that any necessary housing or inclosure, means for melting or maintaining in a molten condition the glass metal, means for forcing air or gas and for circulating water or other cooling or heating agent will be supplied wherever necessary and in any common and well-known form. These matters being of universal employment in connection with glass-making apparatus need only be indicated conventionally or diagrammatically. Fig. 2 is a similar view, but showing the effect of initial blowing in the formation of a small globule or hollow body; Fig. 3, a like view showing such globule clamped or grasped by a suitable lifting device; Fig. 4, a view illustrating the effect of elevation of the clamp with the globule and of simultaneous admission of air or gas under pressure within such globule, resulting in the formation of a hollow sphere of a diameter determinable by the degree of pressure within the globule and the rate of elevation; Fig. 5, a view indicating the result of continued elevation at uniform speed of the bait or body produced as indicated in the preceding figure.

A indicates the bed or floor of the apparatus, which may be partially or wholly covered, if desired, or may be the floor of a suitable chamber.

B indicates a hollow or jacketed vessel fitting beneath and serving to close or to form a bottom for an opening formed in the floor A. This vessel or receptacle B, with or without the walls of the opening in the floor A, constitutes a holder or receptacle for molten glass. It may be supplied from pots, from a tank, or in any other convenient way. Advisably gas-burners C will be furnished, whereby the "batch" may be brought to molten state in the receptacle or the metal may be maintained in the proper state of fluidity. Vessel B is shown as of hollow form and provided with pipes $a$ and $b$ for the supply and discharge of water or other cooling agent. At its center is a vertical opening, preferably though not necessarily of circular form, through which passes a plunger or core D, comprising an outer shell and an inner tube $d$, the latter here shown as concentrically arranged within the shell. Pipes $e$ $f$ serve to admit and withdraw water or other cooling agent from the interior of the shell or the space between said shell and the central tube $d$. Said central tube $d$ communicates by a hose or other suitable connection $g$ with a source of air or gas pressure.

E indicates a clamping device suspended by a chain or cable $h$ and preferably carried over a pulley $i$ and thence to any suitable winding or hoisting device. The clamp may be of any desired construction, as may also the hoisting devices, the illustration being suggestive merely.

The method, mode, or art of forming cylinders and other bodies is as follows: Molten glass is supplied to the vessel B, preferably from tanks, pots, or other suitable melting-receptacles, or it may be produced by melting down the batch in the receptacle itself. At the time of introducing the molten glass into the receptacle B or melting down the batch therein the plunger D is raised to about the position indicated in Fig. 1, assuming that the level of the molten glass will be about as there indicated. Water or other cooling agent being caused to circulate through the vessel B and the plunger D will cool the same and cause the formation of a film, layer, or lining $j$, of glass, partially set or chilled, this film or layer covering the inner side walls and bottom of vessel B and also the raised or exposed portion of plunger B. This film or layer of chilled or partially-set glass being thus produced, air or other gas is introduced under suitable pressure through the central pipe $d$, causing the film lying over the top of the plunger to be blown or expanded into a hollow bulb or globule, as indicated in Fig. 2, the same rising above the level of the molten glass and affording a means or a point of attachment for the grapple or clamp E. Said clamp is opened and then closed upon and caused to compress and to firmly grasp the bulb or enlargement formed by the initial blowing. The clamp E is elevated immediately after being closed upon or engaged with the bulb. During such elevation the air or gas pressure within the bulb continues, causing the same to expand, the pressure and the rate of elevation determining the rate and degree of expansion, which of course is further dependent upon the degree to which the film $j$ has been chilled or caused to set. In thus expanding the bulb the air or gas strips the glass from the plunger D. the bulb being swelled out or enlarged in the manner indicated in Fig. 4. This action is continued until the diameter of the bulb at the level of the molten glass in vessel B is that of the desired cylinder, tube, or body to be produced. In practice this may vary from quite small diameter up to, say, twenty-four inches or more. As the bulb is thus enlarged and the portion below the top level of the molten glass is forced away from the chilling or cooling surface of the plunger D it will become softened by the molten glass around it and will gradually thin down at the point of greatest diameter and each way therefrom. If now the upper portion of the bulb which constitutes a bait be elevated at a regular rate of speed, it will draw from the molten glass with which its skirt is joined a hollow cylinder of glass of uniform thickness and of perfectly straight, regular, and even surface, the thickness being that of the bait at the point where it touches or unites with the body of molten glass. This action is indicated in Fig. 5, where the film or lining $j$ is shown as melting into and disappearing in the mass of molten glass in the vessel B. This action is more or less analogous to that of ordinary glass-blowing—that is to say, the thickness and diameter are determined and maintained constant by determining the thickness and diameter of the glass at the point where the chill or setting of the glass blends with or runs into the unchilled portion.

It is desirable, of course, to maintain as nearly constant as possible the temperature and fluidity of the mass of glass, the rate of elevation, and the pressure of air or gas within the cylinder, as upon these factors depends in considerable degree the uniformity of the cylinder as to thickness and diameter. If the speed be greatly accelerated, the tendency is to contract the cylinder or even to draw it to a point at the lower end, and this method may be resorted to to separate the finished cylinder from the mass, or it may be cut therefrom in any convenient manner.

I have heretofore invented an apparatus for glass-making, wherein was employed a glass bait, the purpose thereof being to avoid the danger, amounting almost to a certainty, of fracturing the cylinder or producing an initial crack whenever a cylinder of considerable length should be blown, by reason of the unequal expansion and contraction of a bait of any other material than glass as related to the expansion and contraction of the glass cylinder itself attached to said bait. In practice it is found that if a bait of iron or like metal be employed to dip into and draw the glass from a pot, tank, or vessel the cooling and contraction of the glass and the bait will be so unequal as to cause the glass to crack by the time the cylinder has reached a very moderate length. The employment of a glass bait obviates this difficulty in great measure, if not entirely. The present invention is, however, advantageous over that of employing a previously-made glass bait in that the preliminary operation of molding, blowing, or otherwise producing the glass bait and bringing the same to and placing it in the drawing apparatus is avoided. More important than this, however, is the fact that under the present mode of procedure the glass bait is produced at the time and from the identical stock of which the cylinder is produced. There can, therefore, be no difference in the grade or quality of the glass forming the bait and that constituting the cylinder. There is no danger of distorting or injuring the bait during the operation of fusing its skirt or edge in and with the molten glass of the tank or receptacle. The diameter and the thickness of the bait at its drawing edge may be varied at will and determined with nicety by the operator, who has only to control the pressure of the air or gas and the rate of drawing or elevation. For all these reasons and others the present plan is advantageous over the prior plan, in which a bait was separately prepared and brought to the apparatus.

It will be observed that I combine in the present process the features of using a glass bait and of blowing the cylinder from within to produce and maintain the desired diameter thereof. So far as I am aware these features have never before been brought together, nor am I aware that any one has ever before blown from the mass of metal or batch of glass out of which the cylinder is to be formed the bait by which such cylinder or body is drawn from the mass. I mean, therefore, to claim these features broadly, and, in fact, to claim the method or the several steps thereof above set forth without regard to the nature, character, or construction of the apparatus employed in carrying the invention into practice and whether special apparatus be employed therefor or the operation be performed manually and with only the usual glass-blowers' implements.

In referring to D as a plunger and in stating that the vessel B has a central opening, I merely direct attention to preferred features of construction. It is not essential that there be a movable plunger. The part D may be a fixture constituting a central boss or core in the vessel or receptacle B. In such a case the glass would be filled into the receptacle to a level somewhat above the top of the stationary plunger and its upper layer allowed to chill. Then by admitting air through the plunger the layer of glass is moved up and formed into a bait. This is mentioned merely to avoid misapprehension on the part of those reading the description, but is immaterial, because the present invention has reference broadly to the method and is in no sense dependent upon nor is it designed to cover any apparatus.

The terms "glass," "glass metal," and the like are used in a comprehensive sense to include all materials of a vitreous nature capable of being drawn into pipes, tubes, cylinders or like bodies and are to be so understood wherever occurring in the specification.

If glass sheets are desired, the cylinder or other body formed as above will be opened, flattened, and annealed in the usual manner. These operations being familiar to all conversant with glass manufacture, need not be further detailed.

Having thus described my invention, I claim—

1. The herein-described method of producing cylinders and other bodies of glass, which consists in chilling or partially setting a film or layer of molten glass; introducing within or beneath the film or layer thus formed, air or gas under pressure and thereby producing a bulb or globule; expanding said globule by internal fluid-pressure to the desired diameter; and lastly, elevating the upper portion of the globule and thereby causing its skirt or edge to carry upward from the mass of molten metal a cylinder or body of glass, substantially as described.

2. The herein-described method or art of producing cylinders and like bodies of glass, which consists in producing within the mass of molten glass a hollow body or film of chilled or partially-set glass; expanding the same by internal fluid-pressure and causing the same to rise above the level of the molten glass and to assume the desired diameter; and finally, elevating the upper portion of the expanded bulb and thereby causing its skirt to carry up from the mass of molten metal a cylinder or hollow body of glass, substantially as described.

3. In the manufacture of glass cylinders and like bodies, the following steps: first, the formation within a mass of molten metal of a hollow film or body of chilled or partially-set glass; and second, the expansion of such partially-set or chilled film or body to the desired diameter by fluid-pressure from within, substantially as described.

4. In the manufacture of glass cylinders and like bodies, the following steps performed in the order stated, viz., first, producing within a mass of molten glass or metal a hollow body or film of partially-set or chilled glass; second, expanding said body or film by fluid-pressure applied within it and thereby stripping the film from the chilling-surface and exposing it to the fusing heat of the surrounding mass of metal; third, elevating the upper portion of the expanded body and thereby carrying upward from the molten metal a cylinder or body of glass of a form and thickness corresponding to the form and thickness of the skirt or depending edge of the elevated body, substantially as described.

5. In the manufacture of glass cylinders and like bodies, the following steps performed in the order stated, viz., first, producing within a mass of molten glass metal a hollow body of partially-set or chilled glass; second, expanding the same by fluid-pressure from within and thereby forcing the sides of said body away from the chilling-surface and holding it in contact with the surrounding molten metal, whereby the film is softened at or about the upper level of the molten mass; third, elevating the upper portion of the expanded body and simultaneously producing or maintaining within it a fluid-pressure, substantially as set forth.

In testimony whereof I have signed my name to this specification in the presence of two subscribing witnesses.

ROGER SHERMAN PEASE.

Witnesses:
 UPTON H. RIDENOUR, Jr.,
 HORACE A. DODGE.